(12) United States Patent
Hall

(10) Patent No.: US 8,818,980 B2
(45) Date of Patent: Aug. 26, 2014

(54) CONNECTION ENGINE

(75) Inventor: Bruce Wayne Hall, San Diego, CA (US)

(73) Assignee: Intouchlevel Corporation, Carson City, NV (US)

(*) Notice: Subject to any disclaimer, the term of this patent is extended or adjusted under 35 U.S.C. 154(b) by 288 days.

(21) Appl. No.: 12/686,031

(22) Filed: Jan. 12, 2010

(65) Prior Publication Data

US 2011/0173173 A1 Jul. 14, 2011

(51) Int. Cl.
*G06F 17/30* (2006.01)

(52) U.S. Cl.
USPC ............ 707/706; 707/754; 707/769; 707/955

(58) Field of Classification Search
None
See application file for complete search history.

(56) References Cited

U.S. PATENT DOCUMENTS

| | | | | |
|---|---|---|---|---|
| 5,617,578 | A * | 4/1997 | Kroll et al. | 704/9 |
| 5,848,404 | A * | 12/1998 | Hafner et al. | 707/769 |
| 5,855,018 | A * | 12/1998 | Chor et al. | 707/741 |
| 6,121,969 | A * | 9/2000 | Jain et al. | 715/850 |
| 6,226,640 | B1 * | 5/2001 | Ostrovsky et al. | 1/1 |
| 6,282,547 | B1 * | 8/2001 | Hirsch | 715/207 |
| 6,330,702 | B1 * | 12/2001 | King | 714/819 |
| 6,366,907 | B1 * | 4/2002 | Fanning et al. | 1/1 |
| 6,405,188 | B1 * | 6/2002 | Schwartz et al. | 707/706 |
| 6,434,556 | B1 | 8/2002 | Levin et al. | |
| 6,725,217 | B2 * | 4/2004 | Chow et al. | 707/706 |
| 6,741,997 | B1 * | 5/2004 | Liu et al. | 1/1 |
| 6,931,604 | B2 | 8/2005 | Lane | |
| 7,080,318 | B2 * | 7/2006 | Devillers | 715/234 |
| 7,092,928 | B1 | 8/2006 | Elad et al. | |
| 7,265,692 | B2 * | 9/2007 | Martin et al. | 341/107 |
| 7,343,594 | B1 * | 3/2008 | Metzgen | 717/140 |
| 7,484,121 | B2 * | 1/2009 | Gangadhar | 714/26 |
| 2003/0182603 | A1 * | 9/2003 | Gass | 714/712 |
| 2004/0024756 | A1 * | 2/2004 | Rickard | 707/3 |
| 2004/0246255 | A1 | 12/2004 | Lin et al. | |
| 2005/0076071 | A1 * | 4/2005 | King et al. | 708/202 |
| 2007/0085716 | A1 * | 4/2007 | Bar-Yossef et al. | 341/87 |
| 2008/0215310 | A1 | 9/2008 | Audant | |
| 2008/0250008 | A1 * | 10/2008 | Gollapudi et al. | 707/5 |
| 2009/0193022 | A1 * | 7/2009 | Lapir et al. | 707/6 |
| 2010/0114882 | A1 * | 5/2010 | Wiegering et al. | 707/728 |
| 2010/0228731 | A1 * | 9/2010 | Gollapudi | 707/737 |
| 2011/0150324 | A1 * | 6/2011 | Ngan et al. | 382/159 |
| 2011/0179064 | A1 * | 7/2011 | Russo | 707/769 |

OTHER PUBLICATIONS

TheBrain.com—About the Brain Visual Knowledge Networks for People http://www.thebrain.com/, Dec. 3, 1998.

\* cited by examiner

*Primary Examiner* — Kaveh Abrishamkar
*Assistant Examiner* — James J Wilcox
(74) *Attorney, Agent, or Firm* — George R. McGuire; Blaine T. Bettinger; Bond Schoeneck & King, PLLC

(57) ABSTRACT

A method and system for identifying a group of objects or content that have a plurality of group-wise connections, and for revealing the evolution of the state of those connections over time. A network of symbols are generated to create a symbol backbone, and raw object or content descriptions are mapped to the generated symbols. To identify the objects or content most closely and most interconnectedly related to a query object or content, the query object or content is mapped onto the symbol backbone. The raw object or content description expression set of the related symbols are retrieved, forming the group of interconnected objects or content. The retrieved object or content descriptions can be further refined.

236 Claims, 5 Drawing Sheets

CONNECTION ENGINE

BACKGROUND OF THE INVENTION

1. Field of the Invention

The present invention relates to a search engine, and, more specifically, to a system and method for identifying objects and content that have a maximum number of group-wise connections, and for revealing the evolution of the state of those connections over time.

2. Description of the Related Art

Search engines are information retrieval tools used to search through pre-indexed information or mine through data. The operation of most search engines, particularly online search engines, is fairly standard. First, information is discovered and indexed by the search engine. Next, a query is run against the indexed information. Lastly, the most relevant indexed information is presented to the user as search results. Variation among search engines most often arises from the algorithms used by the engine to find information and determine the relevance between the query and that information. Developers and programmers are constantly creating new algorithms to obtain the most relevant search results for any given query.

Some search engines are used to cluster or group together diffuse objects or content that have one or more similarities. These clustering engines typically group similar objects or content based upon detectable characteristics such as text, structure, or format. For example, some online clustering search engines index the words in multiple documents or websites and then weight the links between two or more documents (i.e. the engine clusters the documents) based upon the number of words shared between those documents, as well as the frequency with which those shared words appear in the document. The clustered documents thereby form a vast network of shared word nodes. Indeed, many prior methods have attempted to organize information by creating a group of interconnected elements or nodes.

However, current state-of-the-art clustering engines typically only attempt to group information or individuals by a single connection or single characteristic at a time. For example, the clustering engine above only uses the number and frequency of words in a text to cluster documents. Using this technique, there is no guarantee that the clustered documents have anything in common beyond the characteristics of the initial search or criteria.

Accordingly, there is a continued need for an affinity or clustering engine that guarantees that a group or cluster of objects or content will have an internal connection structure beyond that defined by the initial search string. This rich internal connection structure will ensure that the object or content grouping is much more relevant than a grouping created with previous techniques.

There is also a continued need for a clustering engine that functions in real-time or nearly real-time. Previous clustering engines typically use previously-indexed information to identify connections at the time of the user's query. Accordingly, there is a need for a connection engine that continuously monitors and updates connections.

There is also a need for an efficient and comprehensible method of communicating the results of a clustering engine to a user. Although prior methods have included the communication of search results, these communication methods are primarily limited to textual presentation of results. These prior methods do not provide the most efficient or adaptable means for allowing the user to fully explore the results of the search or clustering engine.

BRIEF SUMMARY OF THE INVENTION

It is therefore a principal object and advantage of the present invention to provide a connection engine that guarantees that a group or cluster of objects or content will have an internal connection structure beyond that defined by the initial search string.

It is another object and advantage of the present invention to provide a method for identifying a group of one or more objects or content in which the objects or content have multiple group-wise connections independent of an initial search criteria.

It is yet another object and advantage of the present invention to provide a method for identifying groups of maximally-related objects or content with minimal computational requirements.

It is a further object and advantage of the present invention to provide a system for identifying a group of one or more objects or content in which the objects or content have multiple group-wise connections independent of an initial search criteria.

It is another object and advantage of the present invention to provide a connection engine that monitors and updates connections in real-time or nearly real-time.

Other objects and advantages of the present invention will in part be obvious, and in part appear hereinafter.

In accordance with the foregoing objects and advantages, the present invention provides a method for identifying a group of objects or content, wherein the objects or content have a plurality of group-wise connections. The method comprises the steps of: (a) generating a plurality of sets, wherein each of the plurality of sets comprise at least one of a plurality of binary representations; (b) calculating a first distance between at least one of said plurality of sets and at least one of a plurality of object or content descriptions; wherein the first distance is the difference between a first value obtained from at least one of the plurality of sets and a second value obtained from at least one of a plurality of object or content descriptions; (c) associating at least one of the plurality of sets with the at least one of a plurality of object or content descriptions based on the first distance; (d) associating a query with at least one of the plurality of sets; (d) creating a list, wherein the list comprises each of the plurality of sets related to the query; and (e) identifying each object or content description associated with each set contained within the list.

A second aspect of the present invention provides a system for identifying a group of objects or content, wherein the objects or content have a plurality of group-wise connections. The system comprises a set generator, wherein the set generator generates a plurality of sets. Each of the plurality of sets comprises at least one of a plurality of binary representations. The system also comprises a symbol memory that associates at least one of said plurality of sets with at least one of a plurality of object or content descriptions, wherein at least one of a plurality of object or content descriptions is within a first distance between at least one of the plurality of sets and at least one of the plurality of object or content descriptions. The system further comprises a symbol lookup server that associates a query with at least one of the plurality of sets and creates a list comprising each of the plurality of sets related to the query. The system comprises a symbol expression lookup server that identifies each object or content description associated with each set contained within the list.

A third aspect of the present invention provides a program stored on a computer readable medium. The program comprises: (a) means for generating a plurality of sets that comprise at least one of a plurality of binary representations; (b) means for calculating a first distance between at least one of said plurality of sets and at least one of a plurality of object or content descriptions; (c) means for associating at least one of the plurality of sets with the at least one of a plurality of object or content descriptions based on the first distance; (d) means for associating a query with at least one of the plurality of sets; (e) means for creating a list of every set related to the query; and ((f) means for identifying each object or content description associated with each set contained within the list.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
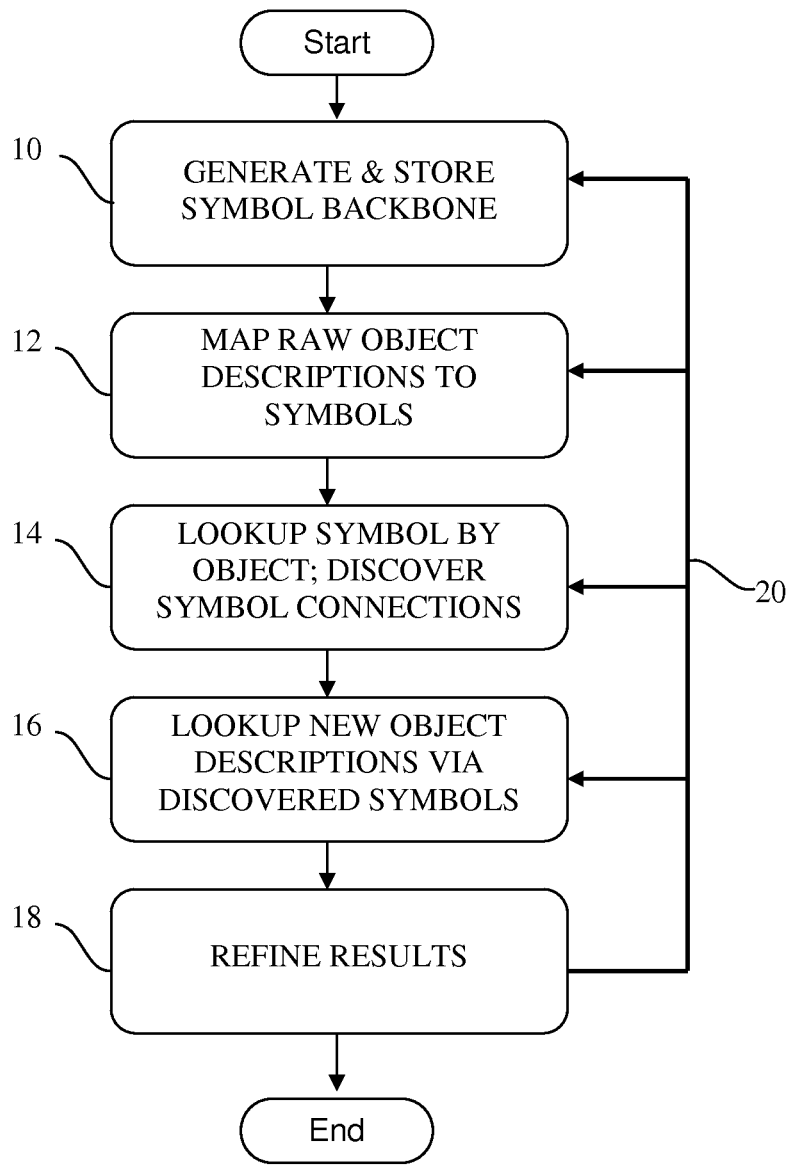
FIG. 1 is a high-level flow diagram illustrating one embodiment of the invention.

The connection search method provides a connection engine, which is a computationally efficient mechanism for finding groups of objects or content that have the maximal number of connections between themselves as a group. A "connection" means any similarity, affinity, or commonality between two or more objects or content. Objects, in turn, can be any thing capable of being analyzed according to the method, including but not limited to people, ideas, viewpoints, images, videos, emails, stories, or groups. Content can be any potential subject of description, including but not limited to any change, fluctuation, happening, action, event, situation, state, status, value, behavior, person, viewpoint, image, story, articulation, gesture, expression, utterance, memory, recollection, dream, fantasy, signal, smell sound, language, message, data, document, information, email, note, link, blog, Tweet™ (trademark of Twitter, Inc.), social graph, forum post, @reply, direct message, private message, reference, article, poem, story, joke, text, transcript, picture, drawing, thought, perception, concept, feature, shape, detail, characteristic, attribute, name, description, design, video, film, song, music, sign, symbol, object, preference, opinion, transaction, process, business, business process, plan, project, pattern, graphic, animation, other possible semiotic, or any possible sequence, arrangement, or combination of content.

In a preferred embodiment, the connection engine is used in a real-time continuous manner and offers users an awareness of changing social factors, such as group dynamics and group composition that may be affected by social choices made by the user. The engine therefore, is useful in making the user aware of groups and connections that are available to the user in real-time, and allows the user to assemble the groups and connections that are most beneficial and/or desirable to the user over time. This is accomplished by allowing the user to learn over time how the social choices (i.e., changes to the raw object or content descriptions) that they make, change the groups and connections that relate to their object or content descriptions at any given time. In other words, the system allows the user to understand the causal effects of changes in themselves to the possible social groupings that are most interconnected to their current state. Otherwise, in a real-time but static sense, the system is intended to allow users to explore the space of connections that are available to them given their current object or content descriptions. As mentioned, it is believed that the level of group interconnection is directly proportional to group dynamics, group interest, group coherence, and group productivity. Therefore, under this view, the results of the connection query will allow the user to better spend their time and energy interacting with individuals that are most likely to maximize the benefit of the social interaction.

In one embodiment, the system acts as a filter to refine the general exposure of a user to only those objects or content that are of the most interest to the user, are of the most benefit to the user, or otherwise enhance the general experience of the user, among many other possibilities. In this way, the system maximizes the user's experience and similarly conserves the user's time and energy.

Referring now to the drawings, wherein like reference numerals refer to like parts throughout, there is seen in FIG. 1 a high-level flow diagram illustrating the connection search method according to one embodiment of the invention. As an initial step 10 in FIG. 1, a symbol backbone—an abstract network of symbols—is generated and stored. The network is created through the following steps. First, a binary representation (an "entry facet") within the identified space is chosen. The features of the entry facet can be chosen by the user, by an application employing connection engine method in whole or in part, or by a programmer, among others. In one embodiment, the selected features include a string length. Second, a mathematical structure called an "equi-set"—a set of facets which are related in a specified manner—is generated. Third, steps one and two are reiterated until all possible entry facets have been explored. Once the symbol backbone is generated, the information is stored in an associative memory (a "symbol memory") as described in further detail below.

The symbol backbone can be further defined by the optional step of mapping the facets (the "interfaces") shared between equi-sets, although this step may optionally be completed at any point in the method. This mapping enables the efficient lookup of symbols by facet(s).

In one embodiment, the symbols are equi-sets that contain one or more facets that are different in a complementary way from every other facet in the set. This constraint of complementary difference is called "multicomplementarity." In this embodiment, the equi-sets are composed of facets of a specified length and equi-distance ("$\delta$"). In a preferred embodiment the equi-distance is the Hamming distance between every facet in the set, although any other known metric function can be used to calculate a distance between facets in a set. Although a maximum, minimum, or range of the Hamming distance can be pre-determined, in a preferred embodiment the Hamming distance will be determined by the size and number of stored symbols. Table 1 contains two examples of equi-sets:

TABLE 1

| $\delta = 4$ | $\delta = 2$ |
|---|---|
| 101010 | 111110 |
| 100101 | 101111 |
| 011001 | 101100 |
| 010110 | 101010 |
|  | 100110 |
|  | 001110 |

As shown in the examples in Table 2, each member of each respective set differs by exactly $\delta$ features relative to every other member of the set. Although the equi-distance in these examples is 2 and 4, it can alternatively range from 0 to a number equal to the length of the strings. The multicomplementarity constraint insures that the number of members that may participate in the set is inversely related to the equi-distance ($\delta$) that defines the set. In other words, the greater is the distance ($\delta$) the fewer members that are allowed in the set, up to the maximum distance (f) which allows only two members, as shown in Table 2:

TABLE 2

| A | 11001101110001100000 |
|---|---|
| B | 00110010001110011111 |

Since strings A and B in Table 2 are perfect complements, this equi-set is restricted to only these two strings. Distances that are smaller than the length of the string do not, however, restrict the equi-sets to large membership cardinalities. Accordingly, it is this inverse property that allows the most members to be shared across equi-sets, and this translates into groups that have the most cross-connections. Unlike sets of members that are maximally similar, sets of multicomplements have sufficient internal variation to form large groups with lots of connections. Continuing the example, Table 3 shows strings with a string length of 6, of which there are 64 unique feature strings.

TABLE 3

| 111111 | 110111 | 101111 | 100111 |
|---|---|---|---|
| 111110 | 110110 | 101110 | 100110 |
| 111101 | 110101 | 101101 | 100101 |
| 111100 | 110100 | 101100 | 100100 |
| 111011 | 110011 | 101011 | 100011 |
| 111010 | 110010 | 101010 | 100010 |
| 111001 | 110001 | 101001 | 100001 |
| 111000 | 110000 | 101000 | 100000 |
| 011111 | 010111 | 001111 | 000111 |
| 011110 | 010110 | 001110 | 000110 |
| 011101 | 010101 | 001101 | 000101 |
| 011100 | 010100 | 001100 | 000100 |
| 011011 | 010011 | 001011 | 000011 |
| 011010 | 010010 | 001010 | 000010 |
| 011001 | 010001 | 001001 | 000001 |
| 011000 | 010000 | 001000 | 000000 |

From the pool of unique binary strings in Table 3 is defined a network of 624 interconnected subsets which bear the relation of multicomplementarity. Because there are so many more equi-sets than there are actual facets, it must be the case that there is a great deal of commonality and sharing of facets between the equi-sets that contain them. In fact, the distribution of equi-sets that are possible from the space in Table 3 define the underpinnings of a look-up mechanism for those sets of possible binary strings that have the maximal number of group-wise interconnections. For example, each binary string can be pictured as the 6-bit decimal integer that it represents. Of the total of 624 equi-sets, 384 of these have defining distances of ($\delta$=2), while 240 have defining distances of ($\delta$=4). Focusing on the equi-sets with an internal distance of four, the degree to which this group of equi-sets is massively interconnected can be shown. The set of 240 equi-sets has 15 entries for any particular feature string that can be selected. For example, if the feature string that represents the decimal integer 42 is selected (see Table 4), then there are 15 equi-sets that contain this feature string.

TABLE 4

| 111111: 63 | 110111: 55 | 101111: 47 | 100111: 39 |
|---|---|---|---|
| 111110: 62 | 110110: 54 | 101110: 46 | 100110: 38 |
| 111101: 61 | 110101: 53 | 101101: 45 | 100101: 37 |
| 111100: 60 | 110100: 52 | 101100: 44 | 100100: 36 |
| 111011: 59 | 110011: 51 | 101011: 43 | 100011: 35 |
| 111010: 58 | 110010: 50 | 101010: 42 | 100010: 34 |
| 111001: 57 | 110001: 49 | 101001: 41 | 100001: 33 |
| 111000: 56 | 110000: 48 | 101000: 40 | 100000: 32 |
| 011111: 31 | 010111: 23 | 001111: 15 | 000111: 7 |
| 011110: 30 | 010110: 22 | 001110: 14 | 000110: 6 |
| 011101: 29 | 010101: 21 | 001101: 13 | 000101: 5 |
| 011100: 28 | 010100: 20 | 001100: 12 | 000100: 4 |
| 011011: 27 | 010011: 19 | 001011: 11 | 000011: 3 |
| 011010: 26 | 010010: 18 | 001010: 10 | 000010: 2 |
| 011001: 25 | 010001: 17 | 001001: 9 | 000001: 1 |
| 011000: 24 | 010000: 16 | 001000: 8 | 000000: 0 |

As shown in Table 5, by choosing any feature string in the set of possible strings listed in Table 4, there are automatically 15 unique equi-sets that include the initial feature string. If the initial feature string is thought of as a component of an individual type, then 15 individual types have been isolated that share the component "101010: 42". As above, all fifteen of these equi-sets can be thought of as sharing the 42-interface, or being connected or joined together by the component 42.

TABLE 5

| 101010: 42 | 110100: 52 | 110001: 49 | 110111: 55 | 111101: 61 |
|---|---|---|---|---|
| 100101: 37 | 101010: 42 | 101010: 42 | 101010: 42 | 101010: 42 |
| 011100: 28 | 010011: 19 | 011111: 31 | 011001: 25 | 010000: 16 |
| 010011: 19 | 001101: 13 | 000100: 4 | 000100: 4 | 000111: 7 |
| 101010: 42 | 110100: 52 | 110001: 49 | 110111: 55 | 111101: 61 |
| 100101: 37 | 101010: 42 | 101010: 42 | 101010: 42 | 101010: 42 |
| 011001: 25 | 011111: 31 | 010110: 22 | 011100: 28 | 010011: 19 |
| 010110: 22 | 000001: 1 | 001101: 13 | 000001: 1 | 000100: 4 |
| 101010: 42 | 110100: 52 | 110001: 49 | 110111: 55 | 111101: 61 |
| 100101: 37 | 101010: 42 | 101010: 42 | 101010: 42 | 101010: 42 |
| 011111: 31 | 011001: 25 | 011100: 28 | 010000: 16 | 010110: 22 |
| 010000: 16 | 000111: 7 | 000111: 7 | 001101: 13 | 000001: 1 |

However, these equi-sets also have an interconnected structure that is inherent in the larger set, and as a result the set of fifteen equi-sets in Table 5 has a much deeper internal structure. While it is true that the entire set is bound by a common interface ("101010: 42"), any single equi-set chosen from among the fifteen shares an additional interface with six other sets in the group. In total, there are fifteen different interfaces that join three sets each in addition to the single interface ("101010: 42") that unifies all the sets. In other words, there is a single group commonality, and then the entire group is then cross-wired by fifteen other commonalities that are shared by fifteen subgroups of three sets each. Since the fifteen secondary interfaces only connect three equi-sets at a time, and every feature string represented in this set of equi-sets enters into one such interface, it is not the case that the whole group is totally connected twice. Therefore, there are six equi-sets that are connected twice to any given equi-set, and then nine that are only connected to it by the initial selection string ("101010: 42"). In this sense, the group has the additional structure of every set being more connected to some sets than others although all sets share the primary connection. This complex structure is a natural characteristic of groups of objects or content.

Current state-of-the-art affinity and relevance search techniques only attempt to group individuals by a single connection at a time, but then there is no guarantee that the group has anything else in common beyond the characteristics of the initial search. In contrast, the connection engine delivers a group that shares the primary commonality, but then further guarantees that the group has a rich internal connection structure that is independent of the initial search criteria. Because it is the internal connection structure that determines the dynamics and cohesion of the group, the results of the connection search engine are superior to current techniques for the purposes of finding groups of objects or content that maximize the value of group-internal social interactions.

The method of symbol generation using the multicomplementarity constraint as explained above is one of many methods using proxsymmetry. Multicomplementarity is achieved when the proxsymmetry value is maximal for any set of binary representations. As a result, any prior selected value of the proxsymmetry function will stand as a constraint on the composition of symbols, and will therefore give rise to various symbol backbones. The symbol generator can alternatively use any pre-selected proxsymmetry value (other than maximal) in order to produce a particular symbol backbone for any particular purpose. Indeed, the backbone can be generated given any desired proxsymmetry value, thereby allowing for the creation of a continuum of possible symbol backbones which may be used for different purposes.

Since all possible symbol compositions correspond to some proxsymmetry value, all possible symbol definitions that may be used as a constraint to generate a symbol backbone, can be expressed in terms of a pre-chosen proxsymmetry value as a criteria. Therefore, in this embodiment, any possible way of defining criteria for symbol backbone generation comes back to the formula for proxsymmetry.

The interconnectedness of any particular symbol backbone is the result of the connection properties of the individual symbols of which it is composed. In the preferred embodiment, each symbol in a backbone will possess a proxsymmetric value such that the symbol is a plurality of binary representations that adhere to a formal specification such as a cardinality of features or a cardinality of the plurality of binary representations. Symbol backbones in general may be formed of a set of homogeneous symbols that share a common proxsymmetry value, or can be formed of a set of heterogeneous symbols with respect to proxsymmetry that have either arbitrary proxsymmetry values (i.e., a random distribution of proxsymmetry values) or have a distribution of proxsymmetry values defined by a set of parameters or sufficient statistics as is common regarding general and well-known distributions such as Normal, Cauchy, Exponential, Weibull, Lognormal, Gamma, Beta, Binomial, and Poisson distributions, among others.

In the case of a homogeneous symbol backbone, the backbone itself may be said to have a characteristic proxsymmetry, wherein the proxsymmetry value of each participating symbol is identical. Moreover, in the special case of multicomplementarity the characteristic proxsymmetry of the backbone may be maximal for a particular formal specification of the general symbol employed, such as a cardinality of features and a cardinality of the plurality of binary representations. In the case of a heterogeneous symbol backbone, while the backbone itself cannot be said to have a unique characteristic proxsymmetry, the overall character of the distribution of backbone proxsymmetry may be described in terms of distribution parameters or sufficient statistics.

In addition, various symbol backbones may be generated for different purposes based solely on the characteristics of a particular distribution of proxsymmetry that holds among the proxsymmetry values of the symbols. A symbol backbone may be assembled from, or selected from, a plurality of symbols that demonstrate a certain distribution of proxsymmetry as defined by distribution parameters or sufficient statistics. In either case, the symbol backbone may be formed of any subset of symbols that is selected from any set of symbols that comply with any desired value or distribution of proxsymmetry that is possible given the formal specification of a symbol such as feature and binary representation cardinalities. In addition, any plurality of raw object or content descriptions themselves may serve as symbols to form a symbol backbone according to any desired value or distribution of proxsymmetry that is possible.

The constraint of multicomplementarity, however, is just one method of symbol generation. The method as claimed can include any means of generating a plurality of sets, depending upon the needs of the user, application, or programmer. For example, depending upon the requirements of the user or the design of the application, there may be a need for compositional symbol structures and/or constraints that yield less than maximum group connectivity, in which case the symbols might not be equi-sets.

In step 12 of FIG. 1, raw object or content descriptions are mapped to the symbol backbone through the following steps. First, an associative memory (the "symbol memory") is initialized. The associative memory can be any type of associative memory capable of storing information about the generated symbols. In a preferred embodiment, the associative memory is a type of content-addressable memory. The symbol memory is then trained on the set of symbols that form the symbol backbone. Symbol memory training will be discussed in greater detail below.

Once the symbol memory is trained, it is used to associate raw object or content descriptions with the closest symbol in the symbol backbone. The raw object or content description is typically a set of facets that take the form of a set of features describing that object or content. These raw object or content descriptions can be a user-defined selection presented to the associative memory, a set of descriptions selected by an application or programmer, or another defined set of descriptions. In one embodiment, each stored symbol (or equi-set) defines or is assigned an "association radius." If a raw object or content description falls within this association radius, the object or content is associated with that symbol. When analyzing actual data, however, it is unlikely that the raw object or content descriptions will be perfectly aligned with any particular symbol. Indeed, it is expected that raw object or content descriptions will be widely distributed around the symbols in the symbol backbone. Once the raw object or content descriptions are mapped to the symbol backbone, the object or content representation becomes associated with various other symbols through the available interconnections of the abstract symbol network. The associations (the "association data") are then stored in the symbol look-up mechanism, which will be described in further detail below. The raw object or content descriptions can be presented to the associative memory as often as necessary to satisfy the needs of the user, application, or programmer, including in a real-time or near real-time manner.

In addition to the methods described elsewhere in this application, the association or degree of association between a symbol in the symbol backbone and a raw object or content description, between any two or more raw object or content descriptions, or between any other binary, ordinal, or quantitative components of the system may be established based on a first distance, wherein the first distance is a measurement of the similarity or dissimilarity of the two or more components. If the topology of the metric space of the components is metrizable, the distance may be determined according to any known metric or distance function, including but not limited to a pseudometric, quasimetric, semimetric, premetric, pseudoquasimetric, or any combination thereof. Specific examples include but are not limited to Euclidean, Manhattan, Mahalanobis, Hamming, Spearman, Footrule, Kendall, Cayley, Ulam, Chebyshev, Minkowski, Canberra, or Bray Curtis (Sorensen) distances. In a further embodiment, the association or degree of association is determined using Jaccard's coefficient, normalized rank transformation, correlation coefficient, angular separation, or any known matching coefficient.

In one embodiment of the method, once a raw object or content description is mapped to the symbol backbone a quantitative measurement of the association between the object or content description and the associated symbol is calculated and stored. The measurement of the association can be any measureable, detectable, or quantifiable difference between the symbol and the raw object or content description, or any measureable, detectable, or quantifiable similarity between the symbol and the raw object or content description.

In a preferred embodiment, the quantitative measurement is a distance calculated by the system (the "proxsymmetric delta") between the raw object or content description and the associated symbol using the following equation:

$$-\sum_{i=1}^{f} P(\delta_i)^2 \log \delta_i$$

In one embodiment, the associated symbol represents a local maxima for proxsymmetry, but to the degree to which the raw individual description diverges from this point it will be locally sub-optimal. This distance approximates how well the raw object or content description maps to the associated symbol and also how well it maps into the symbol backbone. Used in this way, the proxsymmetric delta metric therefore serves as an optimality criterion for the connection engine. Indeed, the proxsymmetric delta can be used to evaluate the potential participation of raw object or content descriptions in the return set. For example, after looking up the set of raw individuals according to the backbone connections of their symbols, the system can exclude those raw object or content descriptions that are not sufficiently associated with the associated symbol according to some defined threshold defined internally, by an application, or by a user. Optionally, the user may employ various impression generating devices in order to optimize the proxsymmetric delta.

In this embodiment, proxsymmetric delta measures the difference in the proxsymmetry values between any raw object or content description and the associated symbol. Optimization of the proxsymmetric delta value, preferably by minimizing the delta, is a critical function of the method. The proxsymmetric delta distance indicates the fidelity, or degree to which an associated symbol is a true representation of the raw object or content description. Since all connection relations are guaranteed to hold between symbols only, the degree to which these relations hold of the raw object or content description will depend on how close, in terms of proxsymmetry value, the description is to the symbol. Therefore, the proxsymmetric delta is an indication of the degree to which the connection relations that hold of the symbol also hold of the relevant raw object or content description.

Regarding mapping the raw object or content descriptions to the symbol backbone, the significance of the discovered associations increases with the optimization of the proxsymmetric delta value. Therefore, the closer that the raw object or content description being used as an entry point is to the actual symbol on the backbone, the more meaningful will be the connections discovered among the symbols that are discovered on the backbone. Indeed, the proxsymmetric delta indicates the current level of divergence of the raw object or content description from its local proxsymmetry optima. As the raw object or content description gets closer to, or further away from any particular associated symbol, the contents and fidelity of any connection search results is expected to change, and offer insight into the potential "connection effects" that result from changes in the raw object or content description. The proxsymmetric delta may be updated as often as desired or else as warranted by changes in the raw object or content description, simply by accessing the symbol memory.

As the raw object or content descriptions change due to user choice or activity, the proxsymmetric delta will vary. When viewed from the perspective of the query or the result set, visualizations (or other perceptual representation) of the delta will provide the user with an impression of how the user is moving closer to, or further away from, other individuals in the system on a real-time basis. Optionally, as the raw object or content descriptions change due to user choice or activity, the associated symbol may shift completely to a new symbol thereby allowing new connection relations to emerge and/or else causing existing connection relations to vanish (i.e., go out of scope).

In yet another embodiment, the qualitative measurement of the association between the object or content description and the associated symbol can be used or analyzed using a threshold—set as part of some global setting—to determine which raw object or content descriptions will be associated with each symbol. In this way, the threshold sets the system sensitivity for allowed associations according to some minimum association strength. Although this embodiment likely reduces storage requirements, it also interferes with the user's or application's ability to explore a more complete dataset.

Figure 3:
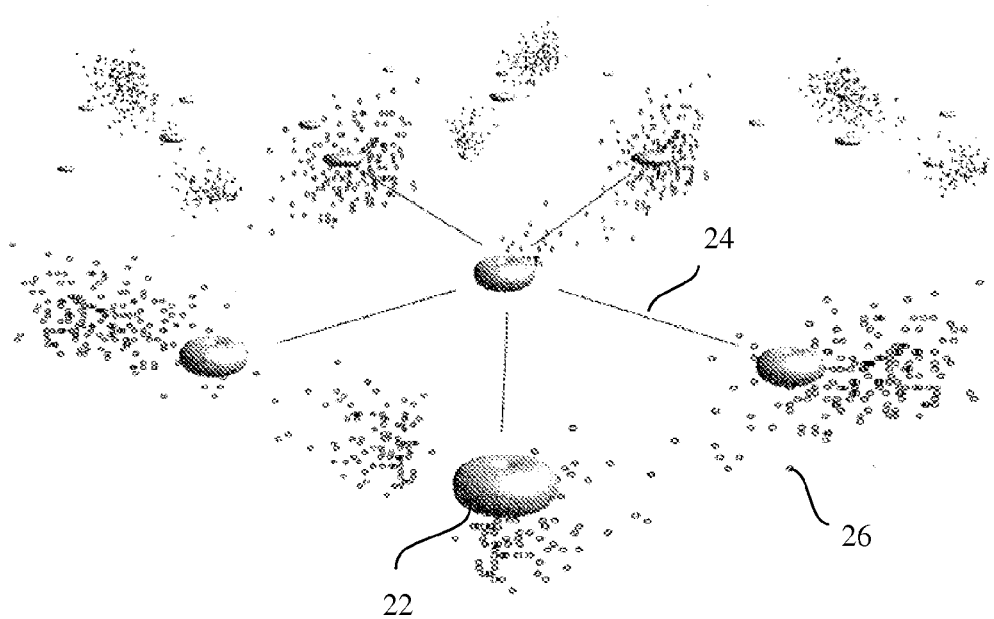
FIG. 3 is a graphical representation of the symbol backbone with clusters of raw object or content descriptions.
Figure 4:
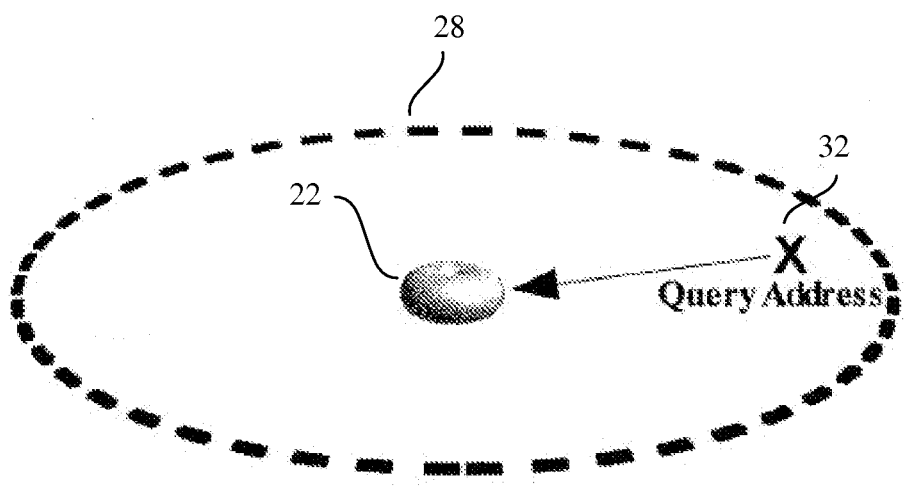
FIG. 4 is a graphical representation of the association radius of the association memory according to one embodiment.

FIG. 3 is a high-level graphical representation of one embodiment of the symbol backbone with clusters of raw object or content descriptions. Although in certain embodiments the generated symbol backbone is not visualized by any user, FIG. 3 shows the general concepts of a symbol backbone. The symbol backbone is comprised of symbols 22 that are optionally interconnected by a determined variable as described above and as represented by lines 24 in FIG. 3. Raw object or content descriptions 26 can then be mapped to the symbol backbone. The symbol memory associates raw object or content descriptions 26 with the closest symbol 22 in the symbol backbone, as shown in the high-level graphical representation in FIG. 4. Symbol 22 will have an association radius 28, and any raw object or content description that falls within the association radius can be associated with that symbol. In addition, after the symbol backbone is generated and the raw object or content descriptions are associated by the system with symbols on the backbone, the system can be used to associate a query or additional object or content descriptions 32 with any symbol 22 with an association radius 28 that contains the query or description. All these processes are described in greater detail in other parts of this specification.

Once a symbol backbone is generated and stored, and the raw object or content descriptions are mapped to the generated symbol backbone, this wealth of information can be used to discover groups of objects or content that share a connection to a search criteria and share multiple group-wise connections among themselves. To do this, a search criteria is mapped onto or presented to the symbol backbone, symbols with the requisite connections are retrieved, and the raw object or content descriptions associated with the retrieved symbols up to a desired level of relevance and internal connectivity are determined. As shown in step 14 of FIG. 1, one or more objects or content are used to lookup symbols on the symbol backbone. A query facet is presented and a list of all symbols that share or are related to the presented facet is created. In the preferred embodiment, the query is one facet (binary representation) of a plurality of binary representations of a raw object or content description. A query can be a partial object or content description up to and including the entire object or content description, thereby encompassing multiple facets. The query may also, for example, be more than one binary representation, facet, object description, or content description, among other things.

In another embodiment, the query is presented and a list of all symbols that contain a facet or description within, at, or outside of a certain distance with the query is created. For example, the system could return a list of all symbols that contain a facet, description, or other feature of the system that is within or equal to a certain Hamming distance to the query. The system could also return a list of all symbols that are outside a certain Hamming distance to the query. The distance could alternatively be measured by any of the other functions, metrics, or methods described herein. In yet another embodiment, the system could return a list of all symbols that do not contain the query. The system could alternatively return a list of symbols that contain, do not contain, or are proximal to facets related to the query facet following some pre-determined operation. In other words, the query can be subjected to an operation and the results of the operation can be used to identify symbols according to a criteria of selection. For example, the query can be subjected to a bitwise operation such as a bit-shift before it is presented to the system.

In a preferred embodiment, the first list of symbols that share the presented facet is optionally subjected to an additional step in which the method acquires a second list of all facets shared between the symbols in the first list.

Lastly, a set of symbols is selected from the list of symbols that share the query facet. In a preferred embodiment, the user can optionally restrict this list by selecting specific facets from the second list, or can re-submit one or more of the discovered facets to the symbol backbone to discover new symbols, essentially reiterating this step of the method.

In step 16 of the method, the list of symbols from step 14 is used to map back out of the symbol backbone into the space of associated raw object or content descriptions to discover a set of raw object or content descriptions that meet a desired level of interconnectivity to the query presented in step 14. To accomplish this step, the raw object or content descriptions associated with each of the symbols in the first list above (the "symbol expression") is determined.

In a preferred embodiment, the relevant discovered symbols from step 14 are reverse-mapped back onto the sets of raw object or content descriptions which they represent. In this way, the query object or content description can be associated with discovered object or content descriptions via the intermediary abstract network of symbol connections. The original query object or content description together with the discovered object or content descriptions form a group that is guaranteed to bear the maximum number of group-wise connections subject to the fidelity of the mapping from objects or content to the Symbol backbone, and the fidelity of the reverse-mapping from the Symbol Backbone back to objects or content. In the preferred embodiment, the fidelity of these mappings is determined by a value such as the proxsymmetric delta which measures the proxsymmetric distance between the raw object or content description and the symbol to which it is mapped.

In step 18, the results of the previous steps can optionally be refined, potentially using the quantitative measurement of the association between the object or content description and the associated symbol calculated in step 12. A variable (or pre-programmed) threshold can be used to eliminate object or content descriptions that do not meet the requisite association strength.

In a preferred embodiment, the proxsymmetric value calculated in step 12 is optionally used to refine the results by identifying a subset of raw object or content descriptions that are more relevant. The system retrieves the stored proxsymmetric values or recalculates them as needed to exclude any raw object or content descriptions that exceed a specified value. Alternatively, visualization or other perceptual techniques are used to show the user how the proxsymmetric delta values vary over time.

Figure 2:
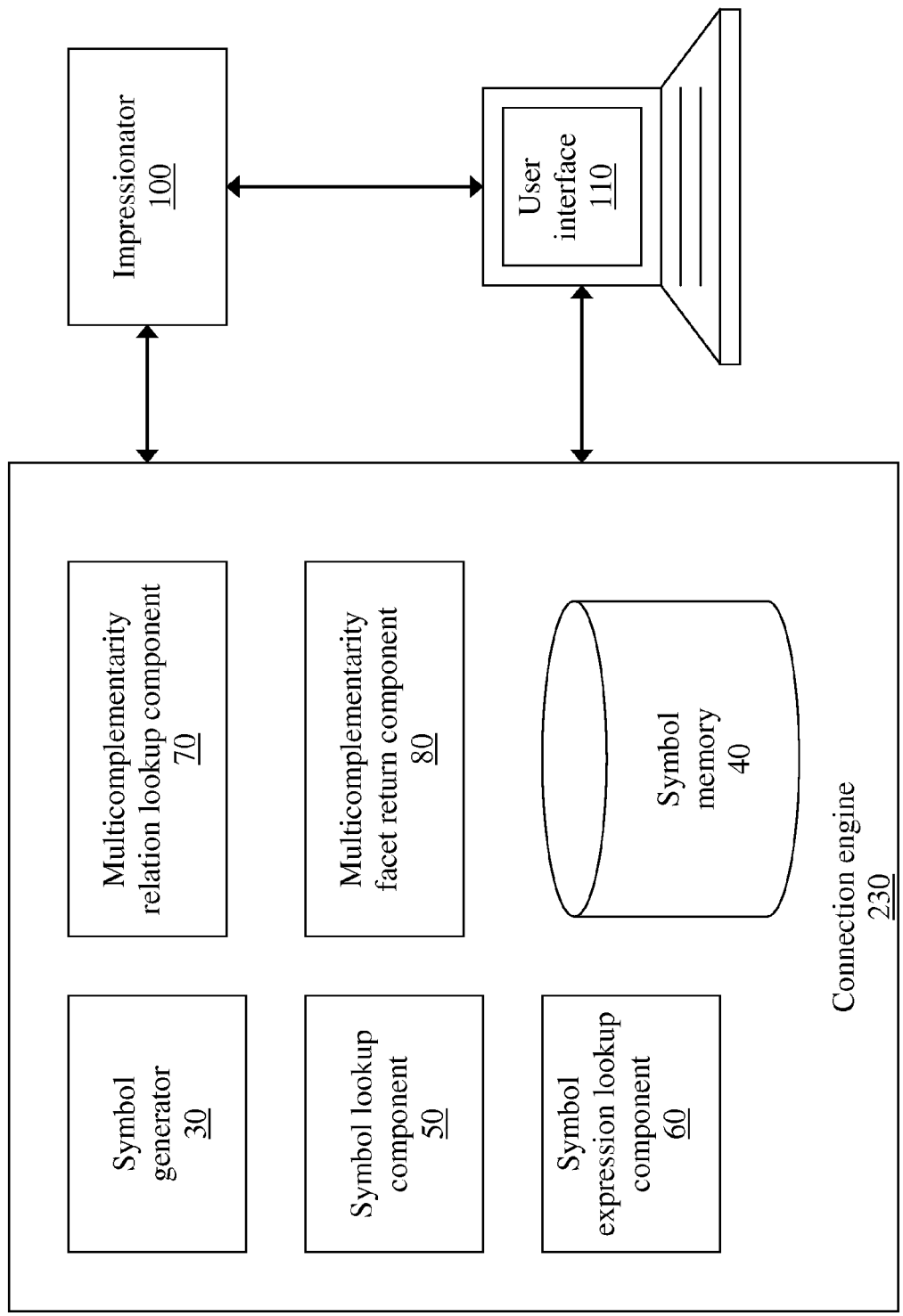
FIG. 2 is a software schematic of the system according to one embodiment of the invention.

FIG. 2 depicts a software schematic of the connection engine system according to one embodiment. In this embodiment, the connection engine accepts a query in the form of a partial description of an object (a facet), and then returns a group of objects or content that has the maximum number of connections between the members. The system optionally provides a way for a user to visualize or otherwise perceive the degree to which it approximates the maximal abstract structure, such that the user may attempt to drive the amount of connectedness in any desired direction over time relative to any possible group. Otherwise, as the object or content descriptions change over time, the results of the connection search will change in real-time indicating the fluctuations of group interrelations and/or potential interrelations. Indeed, the connection engine can be used in a real-time manner to gain awareness of group dynamics, changes in group membership, and the effect of individual actions or changes. Additionally, the connection engine may be used as a discovery tool that allows to users to conduct hypothesis testing or to explore the space of possible groups that form naturally given arbitrary input criteria.

While the search may be conducted in a static and atemporal manner independent of change through time, in a preferred embodiment the system may be used as a real-time monitor and discovery mechanism with respect to the "connection performance" of an individual or collection of raw object or content descriptions. The "connection performance" can be defined as the degree to which an individual or collection of raw object or content descriptions are interconnected, or how that interconnectivity changes over time, according to user choice, user action, system configuration, or system output, among other things. The evaluation of connection performance is subject to changes in the raw object or content descriptions, changes to the symbol backbone, and changes to the system sensitivity, among other changes, on a real-time basis. The raw object or content descriptions themselves are subject to change due to various factors including, but not limited to, user choices and any observational effects that are either external or internal to the system. Since these changes to the raw object or content descriptions often entail a change to either the strength of the symbol association or a complete shift of symbol association, the symbol connections available to a raw object or content description—and the expression of those symbols—are subject to change. This, in turn, results in a fluctuation in connection profile and connection performance. The connection profile can be defined as the set of raw object or content descriptions that bear a degree of interconnectivity to other raw object or content descriptions.

The connection profile and connection performance are also sensitive to changes in the symbol backbone as well as to the selection of alternative symbol backbones based on a continuum of symbol backbone definition criteria. Alternative symbol backbones allow for vastly different sets of associations to a fixed set of raw object or content descriptions, and therefore will typically yield very different connection profile and connection performance results. A user may benefit from having multiple symbol backbones which are available for various purposes and which yield various connection profile and connection performance results, each offering a different insight into the meaning and causal effects of their choices as reflected in the changes to the raw object or content descriptions represented in the system. Changes to the system sensitivity or threshold may also alter the evaluation of connection performance since different sets of connected object or content descriptions will result from the same query based on varying levels of threshold sensitivity.

In one embodiment, the system is operated in a real or near real-time manner by conducting a continuous or periodic update of the associations between symbols and raw object or content descriptions, and then measuring a distance (such as the proxsymmetric delta in the preferred embodiment) that represents the strength of the current or most recent association for all raw object or content descriptions represented by the system. Following the update, any connection query may be conducted based on the latest symbol associations.

As discussed in detail above, the network of symbol connections provide groups of interconnected raw object or content descriptions. The evolution of the connectivity and membership of these groups in real-time determines the connection performance of any raw object or content description. When operated in a real or near real-time manner, the system can periodically undergo the following steps for all object or content descriptions: (i) update symbol associations by querying the symbol memory with a raw object or content description for the associated symbol; and (ii) update the distance measurement between symbol and the raw object or content description. In the preferred embodiment, the distance measurement will be the difference between the proxsymmetry values of the symbol and the object or content description.

Raw object or content descriptions may also change as a result of connection search itself, thereby creating any one of a number of possible feedback loops or mechanisms, as shown by numeral 20 in FIG. 1. In other words, the results of the connection search may influence the raw object or content description and, in turn, alter the results of further connection search, and so on. Therefore, in addition to other factors, the real-time connection search may be influenced by both past and current connection performance.

In another embodiment, the symbol network may also be examined from the perspective of the proximity value of any object or content description, allowing the system to evaluate the connection performance of any raw object or content description in those terms. For example, in the preferred embodiment the proxsymmetry value "v" of any raw object or content description can be measured according to the proxsymmetry metric described above. Next, a symbol backbone is constructed based on symbols that are defined according to proxsymmetry value v. The system may then be used to examine the connection performance of any object or content description, or group thereof, based on that system configuration. Since each specific symbol backbone encodes a separate set of symbol interconnectivity relations, each specific symbol backbone will yield a different set of connection performance results. Additionally, since the system according to this embodiment constructed the symbol backbone using the proxsymmetry value of a specific object or content description, the connection performance results obtained from this system configuration reflect the level of proxsymmetry of the original objector content description.

The real-time connection performance of any object or content description may also be monitored and further described under continuous architectural modulations of the system itself in the form of: (i) fluctuation or creation of raw object or content descriptions; (ii) fluctuation or enhancement or replacement of symbol backbone; or (iii) fluctuation of system sensitivity/thresholding, each of which may be based on the real or near real-time connection performance of any raw object or content description within the system. Accordingly, users may effect the overall interconnectivity of the groups to which they interface through their own choices and play an explicit role in the optimization of their own connection performance as well as the potential connection performance of other raw objects or content to which they may interface. In this sense, all raw object or content descriptions that interface through the mechanism of symbol backbone have the potential to alter the static interconnectivity possibilities of all participating descriptions, and therefore have the potential to alter the connection performance of any participating object or content description over time. Depending on the desired outcome, it is the responsibility of each participating raw object or content description to maximize or minimize the interconnectivity and connection performance of the groups to which they interface.

The real-time functions of the system relate group connectivity and group connection performance back to the choices made by the participating raw object or content descriptions and reinforces the fact that groups of raw object or content descriptions which maintain high interconnectivity and high connection performance represent individuals, objects, and content that bear a natural group-wise cohesion, and similarly that groups of raw object or content descriptions which maintain low interconnectivity and low connection performance represent individuals, objects, and content that bear a natural group-wise aversion. The system therefore monitors and evaluates the effect that any raw object or content description has on the interconnectivity, connection profile, and connection performance of groups to which it interfaces, but also provides a mechanism under which this effect can take place. These effects may be stored, evaluated, visualized or otherwise perceptually represented, or can be fed back into the system as influence, which may then be attributed back to the specific objects and content that rendered the effects through changes in their raw object or content descriptions, change in system status, change in connection profile, or change in connection performance. The system may also introduce a new raw object or content description at any time, notice its connection profile and connection performance, and then generate new descriptions based on these phenomena, and so on.

These influences, in the form of effect on connection profile and performance, may be considered as content itself and can thereby be described and represented within the system as having its own connection profile and connection performance as this relates to other forms of content and objects. In addition the descriptions of influence may be regarded as symbols that may be used to form various symbol backbones to which other descriptions may associate and find additional connections.

Indeed, any behavior, feature, characteristic, static, or dynamic property of the system may itself have a raw object or content description and therefore may constitute an edifice through which the system engages in the process of self-description, and thus may become the basis of further system Operation, further system expression, further system dynamics, features, or properties, among other functions. The ability of the system to engage in connection search based on self-description allows the system to exhibit self-organizing behavior which may give rise to non-obvious emergent properties and behavior which are not predictable at or before run-time. Such behavior may relate to homeostasis, convergence, divergence, cyclicity, autocatalysis, hypercycles, and general non-equilibrium thermodynamics.

As shown in FIG. 2, the connection engine 230 includes a symbol generator 30, a symbol memory 40, a symbol lookup component 50, and a symbol expression lookup component 60. Optionally, the preferred embodiment of the system includes a multicomplementarity relation lookup component 70, a multicomplementarity relation facet return component 80, an impressionator component 100, and a user interface 110.

Given one or more features of an entry facet, symbol generator 30 returns all possible symbols. The one or more features of the entry facet can be chosen by the user, by an application employing connection engine method in whole or in part, or by a programmer, among others.

In a preferred embodiment, symbol generator 30 is given the specification length (f) of possible binary strings. Based on that feature, the symbol generator returns all possible symbols that are defined on the space of those binary strings. In the preferred embodiment, the symbol generator computes the possible sets of binary strings of a given fixed length that satisfy the constraint of multicomplementarity, as described above. This process proceeds in an iterative fashion until all possible entry points have been explored.

In a preferred embodiment, the key to forming such sets is recognizing that each choice of member into the set requires that every new member satisfies the multicomplementarity constraint regarding existing members, and, once included, then imposes a strong constraint on future possible members of the set. Therefore, the order of candidate consideration is often the overriding control in the formation of a possible equi-set. As described above, in this preferred embodiment the equi-sets are defined at least partially by the equi-distance, which defines how far away each member of the equi-set is from every other member. Therefore, in order for a facet to be included in a set, it must be equi-distant from all existing members. The overall structure is therefore a recursive process that—given an equi-distance—looks at every possible entry point and considers the "circle" of points that lie on the radius of some length from the initial point. Any point on the circle of the constraint point is a potential member of an equi-set that contains the initial point. Thereafter, a choice is made from the circle which becomes the next constraint point, and a branch is spawned in the process that represents the equi-set containing the multicomplementary constraint points up to that point. In the preferred embodiment, the symbol generation identifies all symbols prior to the initialization of the Symbol Memory.

Symbol memory 40 can be any type of associative memory capable of storing information about the equi-sets generated by symbol generator 30 and association data regarding the associations between raw object or content descriptions and the symbol backbone. This information is stored in an appropriate memory structure such that associations can be retrieved quickly when needed.

In a preferred embodiment, the associative memory is a type of content-addressable memory. The associate memory returns data that is stored at an address a, when presented with an address a' that is only sufficiently close to the actual address a. The phrase "sufficiently close" can be defined as being within the association radius of a stored symbol. Any address within this association radius which is presented to the system will cause the associative memory to return the data that is associated with the address of the symbol. Ultimately, the purpose of the symbol memory is to find the closest equi-set that exists given any input (raw object or content description) that satisfies one or more minimal formal criteria. The memory is prepared ahead of time by storing the set of equi-sets that are defined mathematically given an observation definition in terms of number of features (f). Therefore, given a definition of observation length as number of features f, the equi-sets are calculated and then stored as symbols in the symbol memory as follows.

In the preferred embodiment, symbol memory 40 comprises: a hard location address set 120 which is a set of randomly pre-selected hard location addresses; the hard location distance storage 130 which stores the distance from the hard address to the query address; the selection radius storage 140 which stores the selection radius; the hard location selection indicator 150 which indicates whether the hard location is selected; the counter array set 160 which is a set of counter arrays used for data storage; the input array 170 which is an array used to hold the input data to train the memory; the summation array 180 which is used to sum the contents of the counters; the thresholding component 190 which is a component for thresholding the contents of summation array 180; the output array 200 which is an array for holding the retrieved data; a query address 210, which is the address used to find the closest stored symbol; and a symbol set 220.

Symbol set 220 is a set of addresses that are used to identify the symbols. In the preferred embodiment, the symbols are equi-sets of binary strings of length f. The addresses are binary strings that are composed by ordering the members of the equi-set either ascending or descending by decimal value, and then concatenating these binary strings into a single binary string called a Symbol String. The symbol string will be of length f×k where k is number of members in the relevant equi-set, as shown in Table 6. The symbol set is then a set of symbol strings of length f×k.

TABLE 6

| Equi-set | |
|---|---|
| 111110 | |
| 101111 | Symbol String |
| 101100 ⇒ | 111110101111101100101010100110001110 |
| 101010 | |
| 100110 | |
| 001110 | |

Hard location addresses are pre-chosen at random from the space of possible query addresses, and are used to locate particular counter arrays where data is stored. In this memory, actual data is stored in multiple counter arrays simultaneously that are designated by the set of hard locations within the selection radius of the query address. These hard location addresses are stored in a set called the hard location address set 120, which may be stored on a single computer or else distributed over a cluster of computers.

In the preferred embodiment, hard location distance storage 130 is storage of unsigned integer data-type that represents the hamming distance between a hard location address and the query address. Selection radius storage 130 is storage of unsigned integer data-type that represents the Selection radius. The hard location selection indicator 150 is storage of bit or Boolean data-type that represents whether or not a particular hard location is within the selection radius of the query address.

Counter array ("CA") set 160 is a set of arrays of signed integer data-type. Each counter array is of the length of the data that is stored in the memory, which in the preferred embodiment is the length of the symbols that are stored in the symbol memory. The CA is used to count the number of zeros and/or ones at each bit of any symbol that is associated with a particular hard location address. If the bit value at a particular location in the symbol string is a one, then one is added to the relevant counter. If the value is a zero, then one is subtracted. In this way, the counters compute the distribution of the bit values of any symbol that is associated with a particular hard location address. Typically, multiple symbols are associated with any one hard location address. The CA set can be thought of as an m×n matrix of counters $C_{ij}$, where m is the number of hard location addresses used in the system, and n is the length of each symbol stored in the system.

Figure 5:
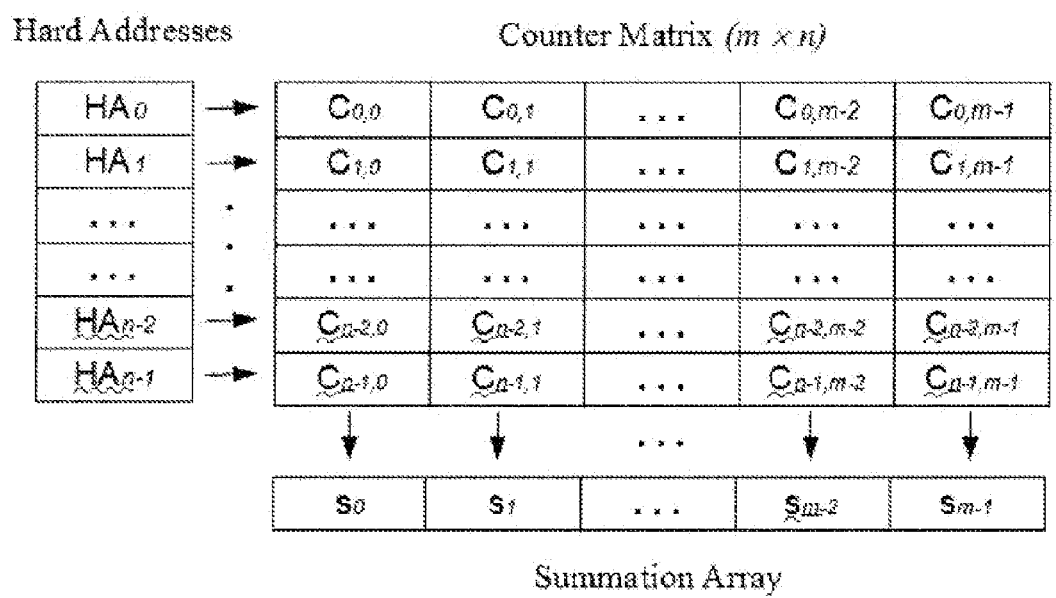
FIG. 5 is a graphical representation of the summation array according to one embodiment.

Summation array ("SA") 180 is an array of signed integer data-type that is of the length of the counter arrays. Each location in the SA stores the summation of each counter ($C_{ij}$) that occurs in a specific location i of the counter array ($CA_j$,) across all hard locations. In other words, for each sum $S_i$ in the SA:

$$s_i = \sum_{j=0}^{n} C_{ij}$$

where n is the number of counter arrays. SA 180 stores the sums of the distribution of all the bit-values of any symbols stored at a hard location address as they are recorded by the various counters, as shown in FIG. 5.

Thresholding component 190 is an evaluation of the summation array that produces a 1 in the $i^{th}$ cell of the output array if the value of $s_i$ is greater than zero, otherwise a zero is produced in the $i^{th}$ cell of the output array if the value of $s_i$ is less than or equal to zero. Output array 200 is an array of bit/Boolean data-type (bit string) that stores the data that is retrieved from the symbol memory. Therefore, the output array stores the symbol that is closest to the query address. The input array 170 is an array of bit/Boolean data-type (bit string) that stores the symbol that is to be stored in the symbol memory. And the query address is the bit string that represents the raw individual.

In a preferred embodiment, the symbol memory must be initialized. In order to initialize the associative memory, the symbol size, the number of hard locations, and the selection radius are determined. The symbol size is determined by the size of the feature strings and the number of members in the equi-sets that the symbols represent. The number of hard locations is determined depending on the size of the data to be stored, and how many data points will be stored. The selection radius is optimized depending on the number of hard locations.

Symbols are then stored in symbol memory 40 by first presenting the symbol string to the system in input array 170. Next, the hard location address set 120 is traversed and the Hamming distance between the hard location and the symbol string is measured. If the distance is within the selection radius, the hard location is flagged with hard location selection indicator 150 as being selected. For each selected hard location a counter array will be available. For each cell in the Input Array, if the value is one, one is added to the $i^{th}$ counter in every Counter Array that is associated with a selected hard location. Otherwise, for the $i^{th}$ cell in input array 170, if the value is zero, one is subtracted from the $i^{th}$ counter in every counter array that is associated with a selected hard location. In this way, the input array is "written" to every counter array that has a selected hard location, and these values contribute to the distribution of all symbols that are stored at those selected hard locations. All symbols that are to be stored in the symbol memory are presented to the memory in this way.

To retrieve symbols from the symbol memory, a query address is presented. When the query address is presented, hard location address set 120 is traversed and the Hamming distance between every hard location and the query address is measured. If the distance is within the selection radius, then the hard location is flagged as being selected. For each selected hard location a counter array will be available. Next, only the counter arrays that are associated with selected hard locations are summed into summation array 180. Summation array 180 is then thresholded into output array 200. The contents of the output array are fed back into the query address, and this process is iterated until the memory converges. The memory converges when the output array values are no longer changing, or else changing only within a desired tolerance.

The system shown in FIG. 2 also comprises symbol lookup component 50, which quickly retrieves the symbol that has been identified as being associated with a particular raw object or content description. In a preferred embodiment, the association of raw object or content description to individual symbol is stored in a (distributed) hash table where the raw object or content description acts as the key and the symbol acts as the as the unique value that is associated with that key. This is possible because there will only be one symbol of a certain equi-set definition associated with a raw object or content description with respect to one symbol backbone for a given purpose at any given time. Symbol lookup component 50 provides a symbol look-up mechanism for any raw object or content description for which a symbol has been identified.

The system further comprises symbol expression lookup component 60. It may be the case that many raw object or content descriptions are associated at any given time to a single symbol with respect to one symbol backbone. The set of any associated object or content descriptions are called the expression of the symbol. To retrieve the expression of any symbol, the association of every symbol having an expression will be stored in a (distributed) hash table with the symbol acting as the key and the expression as a linked-list of raw descriptions acting as the value. This provides a symbol expression look-up mechanism for any symbol. In a preferred embodiment the list or other component containing the expression may be sorted by either by Hamming distance from the symbol, or else the proxsymmetric delta value, which is the difference in proxsymmetry between the symbol and any particular raw object or content description.

In the preferred embodiment, the system takes any raw object or content description and creates an association (pairing) with an appropriate symbol as described above. At any given time, for each individual description-symbol pair, the one-to-one description-to-symbol relation will be stored in symbol lookup component 50. Otherwise, at any given time, for each individual description-symbol pair, the many-to-one symbol-to-description relation will be stored in symbol expression lookup component 60. Symbol lookup component 50 and symbol expression lookup component 60 can be updated frequently on a regular basis. Accordingly, given any raw object or content description, the current symbol may be obtained without recourse to the symbol memory. Additionally, given any symbol, the current symbol expression may be obtained without recourse to the symbol memory.

The preferred embodiment of the system further includes a multicomplementarity relation lookup component 70 and a multicomplementary relation facet return component 80 for symbol discovery. Once an entry symbol is given, the system will attempt to identify all other symbols connected to the entry symbol by a shared facet. Therefore, in addition to the symbol memory, all symbols are indexed by the decimal representation of facets they contain as members. This can be accomplished, for example, with a distributed hash table with all possible facets acting as keys, and a linked-list of the symbols that contain the facet acting as the value. Alternatively, this can be accomplished as an array of linked lists of symbols where the index of the array cell containing a particular linked-list represents the decimal value of the facet contained by the symbols in the list. For any facet that is defined by the feature length specification (f), the set of symbols that contain any facet can be quickly looked up by multicomplementarity relation lookup component 70.

Once multicomplementarity relation lookup component 70 has returned a set of symbols, the multicomplementary relation facet return component 80 looks for all facets that are shared between them such that the user may search available connections to other individuals by facet. Because the symbol string includes all facet information, this mechanism simply takes a set of symbol strings and constructs and returns a list of the unique facets that are contained among the symbol strings.

Symbol discovery in response to a query or entry facet or symbol using multicomplementarity relation lookup component 70 and multicomplementarity relation facet return component 80 in the preferred embodiment is described in further detail. Symbol discovery proceeds by identifying a symbol (the "entry symbol") and some facet ("$\Phi$") within that symbol (the "entry facet"). First, the entry facet $\Phi$ is looked up using multicomplementarity relation lookup component 70 which returns all symbols that share $\Phi$ (i.e., are connected by $\Phi$). This set of symbols is called the $\delta_v$–$\Phi$ pool, where $\Phi$ is the decimal representation of the binary facet. Next, the $\delta_v$–$\Phi$ pool is submitted to multicomplementarity relation facet return component 80 which returns a list of all facets that are shared between any two symbols in the $\delta_v$–$\Phi$ pool. Now the user may restrict the $\delta_v$–$\Phi$ pool by selecting any facet from the list and submitting this facet to multicomplementarity relation lookup component 70 and taking the intersection of the results with the $\delta_v$–$\Phi$ pool. Otherwise, the user may leave the pool entirely through iterative and recursive use of multicomplementarity relation lookup component 70 and multicomplementarity relation facet return component 80.

In yet another embodiment, the method and system includes the ability to create and visualize perceptual impressions of the state, configuration, dynamics, or results of the connection search engine, as well as the effects that any changes in the raw object or content descriptions or symbol backbone have on these attributes. This ability to create and visualize perceptual impressions is accomplished through a mechanism called an Impressionator. An Impressionator is any linguistic or non-linguistic aspect of the system such as an attribute, feature, product, data, or behavior that is storable, memorable, visible, audible, tactile, related to olfaction or gustation, or that represents individual or combined interpretations of the values, differences, or dynamics of any measurements provided by the system.

The Impressionator may be 'perceptually associated' to a representation of any raw object or content description, any group of such descriptions, or any representation of any sequence, embedding, or combination of activities that may be undertaken or participated in by a user, group of users, object, group of objects, content, or group of content that are represented within the system. To be 'perceptually associated' means to be, among other definitions, visually connected to either directly or by some linkage, associated by proximity, associated by salience, temporally associated, associated by reference, associated by similarity of dynamics (such as growth, movement, rate of change, trajectory, trajectory change, cycle, fluctuation, rotation, vibration, behavior, or emergence), associated by form, associated by color, or associated by any symbol, label, or other descriptor.

The Impressionator facilitates the communication of complex real-time dynamics of the connectivity between raw object or content descriptions that are represented within the system, as well as the dynamics of the strength of these connections. The Impressionator provides a perceptual interpretation of the changes in the raw object or content descriptions (as driven by object activity), as well as the effects that changes in raw object or content descriptions have on their connectivity to other such descriptions and the strength of those connections in a real-time or near real-time fashion. An Impressionator also provides a perceptual interpretation of the configuration, state, and/or structure of the particular symbol backbone that is being used for any specific purpose. An Impressionator also provides perceptual interpretation of the discovery and exploration of possible connectivity between raw object or content descriptions and the strength of such connections through direct user-defined changes to raw-object or content descriptions or else direct user-defined changes to the definition of the symbol backbone.

As stated above, Impressionators may be used to represent individual or combined interpretations of any the values, differences, or dynamics of any measurements created by, determined by, or provided by the system. In a preferred embodiment, the Impressionator represents one or more of the following values, including but not limited to: (i) the proxsymmetry value of any set of binary representations, which is a measure of proximity and symmetry between a set of representations known as facets; (ii) the proxsymmetry threshold value, which is any possible relevant value of proxsymmetry and which can be specified as a maximum or minimum threshold; (iii) the number of sets occurring within a threshold proxsymmetry value; (iv): the number of sets occurring beyond a threshold proxsymmetry value; (v) the number of sets between two threshold proxsymmetry values; (vi) the number of sets occurring within a specified distance value; (vii) the number of sets occurring beyond a specified distance value; (viii) the number of sets between two specified distance values; (ix) the number of interfaces shared between symbols; (x) the number of symbols sharing an interface; (xi) the number of raw object or content descriptions delivered per shared interface; (xii) the distribution of raw object or content descriptions delivered over shared interfaces; (xiii) the number of features in a chosen binary representation; and/or (xiv) the number of facets per raw object or content description.

In a preferred embodiment, the Impressionator represents one or more of the following differences between any measurements created by, determined by, or provided by the system, including but not limited to: (i) a first distance between two binary representations at the same or two different times, or difference between the state of one binary representation at two different times; (ii) a first distance between interfaces or facets; (iii) the proxsymmetric delta, which is the (absolute) value of the difference between the proxsymmetry values of any two sets of binary representations taken at the same or two different times, or the difference between proxsymmetry values taken of any one set of binary representations taken at two different times; (iv) the difference between the number of sets occurring within two different threshold values; (v) the difference between the state of any value taken at two different times; (vi) the difference between the state of any value taken between two different users; (vii) the difference between the state of any value before and after any change to a raw object or content description; and/or (viii) the difference between the state of any value before and after any change to the symbol backbone or between one or more separate symbol backbones.

In a preferred embodiment, the Impressionator represents one or more of the following dynamics of any measurements created by, determined by, or provided by the system, including but not limited to: (i) a change in the value of a single measurement at different times or over a length of time; (ii) the change in a difference between measurements, including convergence, divergence, fluctuation, or orbit; (iii) the rate of change of a value per unit of time or relative to the change of another value; (iv) the rate of change in difference between two values per unit of time or relative to the change of another value or difference; (v) cyclicity, or the repeating patterns of change; (vi) trajectory, which is the directionality of change of any value or difference; and/or (vii) the change in the directionality of change of any value or difference.

In the system represented in FIG. 2, Impressionator component 100 is any device, component, or method that creates a visual or other perceptible impression of the value, difference, and/or dynamics of any measurements created by, determined by, or provided by the system. The perceptible impression can be conveyed by an image, picture, smell, sound, movement, tactile impression, temperature, color, feeling, or by any other known method of human, animal, or computer perception.

It will often be desirable for the user to navigate their own raw representation to a location that scores highest on the proxsymmetry metric, and is as close to the nearest local optima as possible. As a component of the system, impressionator 100 helps guide the user representation to a local optima by showing the effects, in terms of available connections, of their choices to move toward or else away from certain backbone symbols. Also, the user may explore the connections that would be possible had their raw individual representation been at, or close to, a different symbol. This is accomplished by allowing the user to select any entry representation that they desire, whether or not this representation in fact corresponds to the actual raw object or content description, and then displaying a visualization of the proxsymmetric delta between the chosen entry point and the nearest backbone symbol. Regarding the outward mapping from the symbol backbone back to raw object or content descriptions, it will be desirable to use the proxsymmetric delta in order to understand the significance of the association of the set of returned raw object or content descriptions to the symbols that were discovered on the backbone. In this way, if the user wishes to limit the set of returned individuals to only those representations that occur within a certain proxsymmetry tolerance, the user may specify a minimal acceptable proxsymmetric delta as a filter for potential candidates into the return set.

Although the present invention has been described in connection with a preferred embodiment, it should be understood that modifications, alterations, and additions can be made to the invention without departing from the scope of the invention as defined by the claims.

What is claimed is:

1. A computer-implemented method for identifying a group of objects or content, wherein the objects or content have a plurality of group-wise connections, said method comprising the steps of:
generating a symbol backbone comprising a plurality of symbols, comprising the steps of: (i) generating, using a set generator, a plurality of sets, wherein each of said plurality of sets comprise at least one of a plurality of related binary representations; and (ii) mapping one or more facets between two or more of said plurality of sets;
storing the generated symbol backbone in memory;
mapping a plurality of object or content descriptions to the symbol backbone, comprising the steps of: (i) calculating, using a processor, a first distance between at least one of said plurality of sets and at least one of said plurality of object or content descriptions; and (ii) associating, using said processor, at least one of said plurality of object or content descriptions with at least one of said plurality of sets based on said first distance;
retrieving at least one symbol within said symbol backbone, comprising the steps of: (i) receiving, from a user, a new query, wherein the new query is received after the plurality of sets have been generated; (ii) associating the received new query with at least one of said plurality of sets; and (iii) creating a first list, wherein said first list comprises each of said plurality of sets that are within a predetermined second distance to said received new query, said second distance being the difference between a first value obtained from at least one of said plurality of sets and a second value obtained from said received new query; and
identifying each object or content description mapped to each set contained within said first list.

2. The method of claim 1, wherein said first list comprises each of said plurality of sets containing said query.

3. The method of claim 1, wherein said first list comprises each of said plurality of sets which do not contain said query.

4. The method of claim 1, wherein said second distance is a Hamming distance.

5. The method of claim 1, wherein said first list comprises each of said plurality of sets outside of said second distance.

6. The method of claim 1, wherein said first list comprises each of said plurality of sets equal to said second distance.

7. The method of claim 1, wherein each of said plurality of sets is associated with an address.

8. The method of claim 7, wherein said address is a single binary string, the single binary string comprising every of said binary representations comprising one of said plurality of sets.

9. The method of claim 8, further comprising the steps:
arranging said binary representations by ascending decimal value; and
concatenating said ordered binary representations.

10. The method of claim 9, further comprising the steps:
arranging said binary representations by descending decimal value; and
concatenating said ordered binary representations.

11. The method of claim 1, wherein at least one of said steps is repeated.

12. The method of claim 11, wherein said at least one repeated step is continuously repeated.

13. The method of claim 11, wherein said at least one repeated step is repeated at a pre-defined rate.

14. The method of claim 11, wherein said at least one repeated step is repeated in response to a stimulus.

15. The method of claim 1, further comprising the step: monitoring the association of the at least one of a plurality of object or content descriptions with the at least one of said plurality of sets for any change in said association over a period of time.

16. The method of claim 15, further comprising the step: storing the results of said monitoring.

17. The method of claim 15, further comprising the step: making the results of said monitoring perceivable.

18. The method of claim 1, further comprising the step: monitoring the effect of said step of associating, using said processor, at least one of said plurality of sets with said at least one of a plurality of object or content descriptions based on said first distance, on the association of the at least one of a plurality of object or content descriptions with the at least one of said plurality of sets.

19. The method of claim 1, further comprising the step: monitoring the effect of an internal stimulus on the association of the at least one of a plurality of object or content descriptions with the at least one of said plurality of sets.

20. The method of claim 1, further comprising the step of: monitoring the effect of an external stimulus on the association of the at least one of a plurality of object or content descriptions with the at least one of said plurality of sets.

21. The method of claim 1, further comprising the step: monitoring changes to said plurality of sets over a period of time.

22. The method of claim 21, further comprising the step: storing the results of said monitoring.

23. The method of claim 21, further comprising the step: making the results of said monitoring perceivable.

24. The method of claim 1, further comprising the step: monitoring changes to said first distance over a period of time.

25. The method of claim 24, further comprising the step: storing the results of said monitoring.

26. The method of claim 24, further comprising the step: making the results of said monitoring perceivable.

27. The method of claim 1, further comprising the steps: monitoring an aspect of said group of objects or content; and
converting the results of said monitoring into a self-describing object or content description.

28. The method of claim 27, further comprising the step: calculating a second distance, wherein said second distance is the difference between a first value obtained from at least one of said plurality of sets and a second value obtained from said self-describing object or content description; and
associating at least one of said plurality of sets with said self-describing object or content description based on said first distance.

29. The method of claim 1, further comprising the step: calculating a second distance, wherein said second distance is the difference between a first value obtained from at least one of said plurality of object or content descriptions and a second value obtained from at least one of said plurality of sets.

30. The method of claim 29, wherein said second distance is the difference between a first value obtained from at least one of said plurality of sets and a second value obtained from at least one of said generated plurality of sets.

31. The method of claim 29, wherein said second distance is the difference between a first value obtained from said at least one of a plurality of object or content descriptions and a second value obtained from one of said plurality of object or content descriptions.

32. The method of claim 29, further comprising the step: determining which of said identified object or content descriptions are within a distance equal to or smaller than a maximum value of said second distance.

33. The method of claim 32, wherein said maximum value of said second distance is chosen by a user.

34. The method of claim 33, wherein the user chooses the maximum value of said second distance using a graphical user interface.

35. The method of claim 29, further comprising the step: determining which of said identified object or content descriptions are within a distance equal to or larger than a minimum value of said second distance.

36. The method of claim 35, wherein said minimum value of said second distance is chosen by a user.

37. The method of claim 36, wherein the user chooses the minimum value of said second distance using a graphical user interface.

38. The method of claim 29, further comprising the step: filtering the results of at least one of steps e and f using said second distance.

39. The method of claim 29, further comprising the step: monitoring changes to said first or second value over a period of time.

40. The method of claim 39, further comprising the step: storing the results of said monitoring.

41. The method of claim 39, further comprising the step: making the results of said monitoring perceivable.

42. The method of claim 1, further comprising the step: calculating a second distance, wherein said second distance is the difference between a first value obtained from at least one of said plurality of object or content descriptions and a second value obtained from the at least one of said plurality of sets associated with said at least one of said plurality of object or content descriptions.

43. The method of claim 1, wherein said first distance is the difference between a first value obtained from at least one of said plurality of sets and a second value obtained from at least one of a plurality of object or content descriptions.

44. The method of claim 43, wherein each of said plurality of sets has a common first value.

45. The method of claim 43, wherein said plurality of sets have a variable first value.

46. The method of claim 43, wherein said plurality of sets have first values that are distributed according to a pre-determined parameter.

47. The method of claim 43, wherein said plurality of sets have first values that are distributed according to statistics.

48. The method of claim 43, wherein said plurality of sets is a subset of a larger plurality of sets.

49. The method of claim 43, wherein said plurality of sets is a subset of a larger plurality of sets, said subset comprised of at least one of said larger plurality of sets that falls within a range of said first value.

50. The method of claim 43, wherein said plurality of sets is comprised of object or content descriptions.

51. The method of claim 1, further comprising the step: filtering the results of at least one of said steps.

52. The method of claim 51, wherein said results are filtered by specifying a maximum or minimum number of sets in said first list.

53. The method of claim 51, wherein said results are filtered by specifying a maximum or minimum number of object or content descriptions associated said first list.

54. The method of claim 1, further comprising the step: storing each of said first distances in a first storage device.

55. The method of claim 1, wherein every binary representation in each of said plurality of sets is of equal distance to every other binary representation in that set, said distance calculated by a metric function.

56. The method of claim 1, wherein every binary representation in each of said plurality of sets is of equal Hamming distance to every other binary representation in that set.

57. The method of claim 56, wherein said Hamming distance is a value found within the range between 0 and a number equal to the length of the shortest of the binary representation in that set.

58. The method of claim 1, wherein said first distance is determined using a distance function.

59. The method of claim 1, wherein said query is a binary representation.

60. The method of claim 1, wherein said query is a plurality of binary representations.

61. The method of claim 1, wherein said query is an object or content description.

62. The method of claim 1, further comprising the following step:
mapping at least one of said plurality of binary representations found within at least two of said plurality of sets.

63. The method of claim 1, further comprising the step:
creating a second list, said second list comprising at least one of said plurality of binary representations found within at least two of said plurality of sets contained within said first list.

64. The method of claim 63, further comprising the steps:
selecting a binary representation from said second list; and
creating a third list, said third list comprising at least one of said plurality of sets found in said first list, the at least one of said plurality of sets found in said first list comprising the selected binary representation from said second list.

65. The method of claim 1, further comprising the step:
returning said identified object or content descriptions to a user.

66. The method of claim 65, wherein said identified object or content descriptions are perceived by said user.

67. The method of claim 65, wherein a graphical user interface is used to return said identified object or content descriptions to said user.

68. The method of claim 1, further comprising the step of storing the generated plurality of sets in a first storage device.

69. The method of claim 1, further comprising the step:
storing the associations in a first storage device.

70. The method of claim 1, wherein an associative memory associates said plurality of sets with said plurality of object or content descriptions.

71. The method of claim 1, further comprising the step of:
determining a first value within said group of sets.

72. The method of claim 71, further comprising the steps:
creating a perceptual impression of said first value; and
returning said perceptual impression to a user.

73. The method of claim 72, wherein a graphical user interface is used to return said perceptual impression to said user.

74. The method of claim 71, wherein said first value is a difference between a first measurement and a second measurement within said group of sets.

75. The method of claim 71, wherein said first value is a change over time in a first measurement within said group of sets.

76. The method of claim 71, wherein said first value is a difference between a change over time in a first measurement within said group of sets and a change over time in a second measurement within said group of sets.

77. The method of claim 71, wherein said first value is a measurement between at least two of the generated plurality of sets.

78. The method of claim 71 wherein said first value is a measurement between at least one of said plurality of object or content descriptions and at least one of said plurality of sets.

79. The method of claim 71, wherein said first value is a measurement between at least two of said plurality of object or content descriptions.

80. The method of claim 71, wherein said first value is a measurement between said query and at least one of said plurality of sets.

81. The method of claim 71, wherein said first value is a measurement between said query and at least one of said plurality of object or content descriptions.

82. The method of claim 1, further comprising the step of determining a first value, wherein said first value is a difference between a value of a first user and a value of a second user.

83. A system for identifying a group of objects or content, wherein the objects or content have a plurality of group-wise connections, said system comprising:
a symbol backbone generator configured to generate a symbol backbone comprising a plurality of symbols, the symbol backbone generator comprising: (i) a set generator, wherein said set generator generates a plurality of sets, each of said plurality of sets comprising at least one of a plurality of related binary representations; and a mapping component, the mapping component adapted to map one or more facets between two or more of said plurality of sets;
a non-transitory symbol memory adapted to store the generated symbol backbone;
an associative memory adapted to map a plurality of object or content descriptions to the symbol backbone, wherein said at least one of a plurality of object or content descriptions is within a first distance between said at least one of said plurality of sets and said at least one of a plurality of object or content descriptions;
c. a symbol lookup server adapted to associate a new query received from a user with at least one of said plurality of sets, and further adapted to create a first list, wherein said first list comprises each of said plurality of sets that are within a predetermined second distance to said received new query, said second distance being the difference between a first value obtained from at least one of said plurality of sets and a second value obtained from said received new query; and
d. a symbol expression lookup server, wherein said symbol expression lookup server identifies each object or content description mapped to each set contained within said first list.

84. The system of claim 83, wherein said first list comprises each of said plurality of sets containing said query.

85. The system of claim 83, wherein said first list comprises each of said plurality of sets which do not contain said query.

86. The system of claim 83, wherein said second distance is a Hamming distance.

87. The system of claim 83, wherein said first list comprises each of said plurality of sets outside of said second distance.

88. The system of claim 83, wherein said first list comprises each of said plurality of sets equal to said second distance.

89. The system of claim 83, further comprising a symbol set, wherein the symbol set is a plurality of addresses.

90. The system of claim 89, wherein each of said plurality of addresses is a single binary string, the single binary string comprising every of said binary representations of one of said plurality of sets.

91. The system of claim 90, wherein said binary representations are ordered by ascending decimal value and concatenated into a single binary string.

92. The system of claim 90, wherein said binary representations are ordered by descending decimal value and concatenated into a single binary string.

93. The system of claim 83, wherein at least one of said set generator, said symbol memory, said symbol lookup server, or said symbol expression lookup server repeats a function at least once.

94. The system of claim 93, wherein said repeated function is continuously repeated.

95. The system of claim 93, wherein said repeated function is repeated at a pre-defined rate.

96. The system of claim 93, wherein said repeated function is repeated in response to a stimulus.

97. The system of claim 83, wherein said symbol memory is adapted to monitor the association of the at least one of a plurality of object or content descriptions with the at least one of said plurality of sets for any change in said association over a period of time.

98. The system of claim 97, further comprising:
a first storage device adapted to store the results of said monitoring.

99. The system of claim 97, wherein the results of said monitoring are perceived by a user.

100. The system of claim 83, wherein said symbol memory is adapted to monitor the effect of an internal stimulus on the association of the at least one of a plurality of object or content descriptions with the at least one of said plurality of sets.

101. The system of claim 83, wherein said symbol memory is adapted to monitor the effect of an external stimulus on the association of the at least one of a plurality of object or content descriptions with the at least one of said plurality of sets.

102. The system of claim 83, wherein changes to said plurality of sets over a period of time are monitored.

103. The system of claim 102, wherein the results of said monitoring are stored.

104. The system of claim 102, wherein the results of said monitoring are perceived by a user.

105. The system of claim 83, wherein changes to said first distance over a period of time are monitored.

106. The system of claim 105, wherein the results of said monitoring are stored.

107. The system of claim 105, wherein the results of said monitoring are perceived by a user.

108. The system of claim 83, wherein the system monitors an aspect of said group of objects or content and converts the results of said monitoring into a self-describing object or content description.

109. The system of claim 108, wherein said symbol memory is adapted to associate said self-describing object or content description with at least one of a plurality of object or content descriptions, wherein said self-describing object or content description is within a second distance, said second distance being the difference between a first value obtained from at least one of said plurality of sets and a second value obtained from said self-describing object or content description.

110. The system of claim 83, wherein said symbol memory is adapted to calculate a second distance, the second distance being the difference between a first value obtained from at least one of said plurality of object or content descriptions and a second value obtained from at least one of said plurality of sets.

111. The system of claim 110, wherein said second distance is the difference between a first value obtained from said at least one of said plurality of sets and a second value obtained from at least one of said generated plurality of sets.

112. The system of claim 110, wherein said second distance is the difference between a first value obtained from said at least one of a plurality of object or content descriptions and a second value obtained from one of said plurality of object or content descriptions.

113. The system of claim 110, wherein said symbol expression lookup server determines which of said identified object or content descriptions are within a distance equal to or smaller than a maximum value of said second distance.

114. The system of claim 113, wherein said maximum value of said second distance is chosen by a user.

115. The system of claim 114, wherein the user chooses the maximum value of said second distance using a graphical user interface.

116. The system of claim 110, wherein said symbol expression lookup server determines which of said identified object or content descriptions are within a distance equal to or larger than a minimum value of said second distance.

117. The system of claim 116, wherein said minimum value of said second distance is chosen by a user.

118. The system of claim 117, wherein the user chooses the minimum value of said second distance using a graphical user interface.

119. The system of claim 110, further comprising:
a filter adapted to filter the results of at least one of said symbol lookup server and said symbol expression lookup server using said second distance.

120. The system of claim 110, wherein changes to said first or second value over a period of time are monitored.

121. The system of claim 120, wherein the results of said monitoring are stored.

122. The system of claim 120, wherein the results of said monitoring are perceived by a user.

123. The system of claim 83, wherein said symbol memory is adapted to calculate a second distance, the second distance being the difference between a first value obtained from at least one of said plurality of object or content descriptions and a second value obtained from the at least one of said plurality of sets associated with said at least one of said plurality of object or content descriptions.

124. The system of claim 83, wherein said first distance is the difference between a first value obtained from at least one of said plurality of sets and a second value obtained from at least one of a plurality of object or content descriptions.

125. The system of claim 124, wherein each of said plurality of sets has a common first value.

126. The system of claim 124, wherein said plurality of sets have a variable first value.

127. The system of claim 124, wherein said plurality of sets have first values that are distributed according to a pre-determined parameter.

128. The system of claim 124, wherein said plurality of sets have first values that are distributed according to statistics.

129. The system of claim 83, wherein said plurality of sets is a subset of a larger plurality of sets.

130. The system of claim 129, wherein said subset is comprised of at least one of said larger plurality of sets that falls within a range of said first value.

131. The system of claim 83, wherein said plurality of sets is comprised of object or content descriptions.

132. The system of claim 83 further comprising:
a first storage device adapted to store each of said first distance.

133. The system of claim 83, further comprising:
a filter adapted to filter the results of at least one of said symbol lookup server and said symbol expression lookup server.

134. The system of claim 133, wherein said filter is adapted to filter said results by specifying a maximum or minimum number of sets in said first list.

135. The system of claim 133, wherein said filter is adapted to filter said results by specifying a maximum or minimum number of object or content descriptions associated said first list.

136. The system of claim 83, wherein every binary representation in each of said plurality of sets is of equal distance to every other binary representation in that set, said distance calculated by a metric function.

137. The system of claim 83, wherein every binary representation in each of said plurality of sets is of equal Hamming distance to every other binary representation in that set.

138. The system of claim 137, wherein said Hamming distance is a value found within the range between 0 and a number equal to the length of the shortest of the binary representation in that set.

139. The system of claim 83, wherein said first distance is determined using a distance function.

140. The system of claim 83, wherein said query is a binary representation.

141. The system of claim 83, wherein said query is a plurality of binary representations.

142. The system of claim 83, wherein said query is an object or content description.

143. The system of claim 83, wherein the symbol memory is further adapted to map at least one of said plurality of binary representations found within at least two of said plurality of sets.

144. The system of claim 83, further comprising:
a multicomplementarity relation lookup component, the multicomplementarity relation lookup component adapted to create a second list, said second list comprising at least one of said plurality of binary representations found within at least two of said plurality of sets contained within said first list.

145. The system of claim 144, further comprising:
a multicomplementarity relation facet return component, said multicomplementarity relation facet return component adapted to create a third list, said third list comprising at least one of said plurality of sets found in said first list, the at least one of said plurality of sets found in said first list comprising a binary representation selected from said second list.

146. The system of claim 83, further comprising:
an impressionator.

147. The system of claim 146, wherein said impressionator is adapted to create a perceptual impression of a first value within said group of sets.

148. The system of claim 147, wherein said impressionator is further adapted to return said perceptual impression to a user.

149. The system of claim 147, further comprising:
a graphical user interface adapted to return said perceptual impression to said user.

150. The system of claim 146, wherein said first value is a difference between a first measurement and a second measurement within said group of sets.

151. The system of claim 146, wherein said first value is a change over time in a first measurement within said group of sets.

152. The system of claim 146, wherein said first value is a difference between a change over time in a first measurement within said group of sets and a change over time in a second measurement within said group of sets.

153. The system of claim 83, wherein said impressionator is adapted to create a perceptual impression of a first value, said first value being the difference between a value of a first user and a value of a second user.

154. The system of claim 83, wherein said identified object or content descriptions are perceived by a user.

155. The system of claim 83, further comprising:
a graphical user interface.

156. The system of claim 83, further comprising:
a first storage device adapted to store the generated plurality of sets.

157. The system of claim 83, wherein said symbol memory is an associative memory.

158. A program stored on a non-transitory computer readable storage medium, the program comprising:
means for generating a symbol backbone comprising a plurality of symbols, said means comprising: (i) means for generating a plurality of sets, wherein each of said plurality of sets comprise at least one of a plurality of related binary representations; and (ii) means for mapping one or more facets between two or more of said plurality of sets;
means for storing the generated symbol backbone in memory;
means for mapping a plurality of object or content descriptions to the symbol backbone, said means comprising: (i) means for calculating a first distance between at least one of said plurality of sets and at least one of a plurality of object or content descriptions; and (ii) means for associating at least one of said plurality of object or content descriptions with at least one of said plurality of sets based on said first distance;
means for retrieving at least one symbol within said symbol backbone, said means comprising: (i) a means for receiving, from a user, a new query, wherein the new query is received after the plurality of sets have been generated; (ii) means for associating the received new query with at least one of said plurality of sets; and (iii) means for creating a first list, wherein said first list comprises each of said plurality of sets that are within a predetermined second distance to said received new query, said second distance being the difference between a first value obtained from at least one of said plurality of sets and a second value obtained from said received new query; and
means for identifying each object or content description mapped to each set contained within said first list.

159. The program of claim 158, wherein said first list comprises each of said plurality of sets containing said query.

160. The program of claim 158, wherein said first list comprises each of said plurality of sets which do not contain said query.

161. The program of claim 158, wherein said second distance is a Hamming distance.

162. The program of claim 158, wherein said first list comprises each of said plurality of sets outside of said second distance.

163. The program of claim 158, wherein said first list comprises each of said plurality of sets equal to said second distance.

164. The program of claim 158, wherein each of said plurality of sets is associated with an address.

165. The program of claim 164, wherein each of said addresses is a single binary string, the single binary string comprising every of said binary representations of one of said plurality of sets.

166. The program of claim 165, further comprising:
means to order said binary representations by ascending decimal value; and
means to concatenate said ordered binary representations.

167. The program of claim 165, further comprising:
means to order said binary representations by descending decimal value; and
means to concatenate said ordered binary representations.

168. The program of claim 158, further comprising means to repeat at least one of said means.

169. The program of claim 158, wherein said means for associating at least one of said plurality of sets with at least one of a plurality of object or content descriptions further comprises means for repeating said associating.

170. The program of claim 169, wherein said means for repeating continuously repeats said associating.

171. The program of claim 169, wherein said means for repeating repeats said associating at a pre-defined rate.

172. The program of claim 169, wherein said means for repeating repeats said associating in response to a stimulus.

173. The program of claim 158, further comprising:
means for monitoring the association of the at least one of a plurality of object or content descriptions with the at least one of said plurality of sets for any change in said association over a period of time.

174. The program of claim 173, further comprising:
means for storing the results of said monitoring.

175. The program of claim 173, further comprising:
means for perceiving the results of said monitoring.

176. The program of claim 158, further comprising:
means for monitoring the effect of said means for associating at least one of said plurality of sets with said at least one of a plurality of object or content descriptions, on the association of the at least one of a plurality of object or content descriptions with the at least one of said plurality of sets.

177. The program of claim 158, further comprising:
means for monitoring the effect of an internal stimulus on the association of the at least one of a plurality of object or content descriptions with the at least one of said plurality of sets.

178. The program of claim 158, further comprising:
means for monitoring the effect of an external stimulus on the association of the at least one of a plurality of object or content descriptions with the at least one of said plurality of sets.

179. The program of claim 158, further comprising:
means to monitor changes to said plurality of sets over a period of time.

180. The program of claim 179, further comprising:
means to store the results of said monitoring.

181. The program of claim 179, further comprising:
means to make the results of said monitoring perceivable.

182. The program of claim 158, further comprising:
means to monitor changes to said first distance over a period of time.

183. The program of claim 182, further comprising:
means to store the results of said monitoring.

184. The program of claim 182, further comprising:
means to make the results of said monitoring perceivable.

185. The program of claim 158, further comprising:
means to monitor an aspect of said group of objects or content; and
means to convert the results of said monitoring into a self-describing object or content description.

186. The program of claim 158, further comprising:
means to calculate a second distance, wherein said second distance is the difference between a first value obtained from at least one of said plurality of sets and a second value obtained from said self-describing object or content description; and
means to associate at least one of said plurality of sets with said self-describing object or content description based on said first distance.

187. The program of claim 158, further comprising:
means to calculate a second distance, wherein said second distance is the difference between a first value obtained from at least one of said plurality of object or content descriptions and a second value obtained from at least one of said plurality of sets.

188. The program of claim 187, wherein said second distance is the difference between a first value obtained from said at least one of said plurality of sets and a second value obtained from at least one of said generated plurality of sets.

189. The program of claim 187, wherein said second distance is the difference between a first value obtained from said at least one of a plurality of object or content descriptions and a second value obtained from one of said plurality of object or content descriptions.

190. The program of claim 187, further comprising:
means for determining which of said identified object or content descriptions are within a distance equal to or smaller than a maximum value of said second distance.

191. The program of claim 190, wherein said maximum value of said second distance is chosen by a user.

192. The program of claim 191, wherein the user chooses the maximum value of said second distance using a graphical user interface.

193. The program of claim 187, further comprising:
means for determining which of said identified object or content descriptions are within a distance equal to or larger than a minimum value of said second distance.

194. The program of claim 193, wherein said minimum value of said second distance is chosen by a user.

195. The program of claim 194, wherein the user chooses the minimum value of said second distance using a graphical user interface.

196. The program of claim 187, further comprising:
means to filter the results of at least one of said associating means using said second distance.

197. The program of claim 157, further comprising:
means to monitor changes to said first or second value over a period of time.

198. The program of claim 197, further comprising:
means to store the results of said monitoring.

199. The program of claim 197, further comprising:
means to make the results of said monitoring perceivable.

200. The program of claim 158, further comprising:
means to calculate a second distance, wherein said second distance is the difference between a first value obtained from at least one of said plurality of object or content descriptions and a second value obtained from the at least one of said plurality of sets associated with said at least one of said plurality of object or content descriptions.

201. The program of claim 158, wherein said first distance is the difference between a first value obtained from at least one of said plurality of sets and a second value obtained from at least one of a plurality of object or content descriptions.

202. The program of claim 201, wherein each of said plurality of sets has a common first value.

203. The program of claim 201, wherein said plurality of sets have a variable first value.

204. The program of claim 201, wherein said plurality of sets have first values that are distributed according to a pre-determined parameter.

205. The program of claim 201, wherein said plurality of sets have first values that are distributed according to statistics.

206. The program of claim 158, wherein said plurality of sets is a subset of a larger plurality of sets.

207. The program of claim 206, wherein said subset is comprised of at least one of said larger plurality of sets that falls within a range of said first value.

208. The program of claim 158, wherein said plurality of sets is comprised of object or content descriptions.

209. The program of claim 158, further comprising:
means to filter said first list or said identified object or content descriptions.

210. The program of claim 209, wherein said results are filtered by specifying a maximum or minimum number of sets in said first list.

211. The program of claim 209, wherein said results are filtered by specifying a maximum or minimum number of object or content descriptions associated said first list.

212. The program of claim 158, further comprising:
means for storing each of said first distances.

213. The program of claim 158, wherein every binary representation in each of said plurality of sets is of equal distance to every other binary representation in that set, said distance calculated by a metric function.

214. The program of claim 158, wherein every binary representation in each of said plurality of sets is of equal Hamming distance to every other binary representation in that set.

215. The program of claim 214, wherein said Hamming distance is a value found within the range between 0 and a number equal to the length of the shortest of the binary representation in that set.

216. The program of claim 158, wherein said query is a binary representation.

217. The program of claim 158, wherein said query is a plurality of binary representations.

218. The program of claim 158, wherein said query is an object or content description.

219. The program of claim 158, further comprising:
means for mapping at least one of said plurality of binary representations found within at least two of said plurality of sets.

220. The program of claim 158, further comprising:
means for creating a second list, said second list comprising at least one of said plurality of binary representations found within at least two of said plurality of sets contained within said first list.

221. The program of claim 220, further comprising:
means for creating a third list, said third list comprising at least one of said plurality of sets found in said first list, the at least one of said plurality of sets found in said first list comprising a binary representation selected from said second list.

222. The program of claim 158, further comprising:
means for returning said identified object or content descriptions to a user.

223. The program of claim 222, wherein said identified object or content descriptions are perceived by said user.

224. The program of claim 158, further comprising:
a graphical user interface.

225. The program of claim 158, wherein said graphical user interface is used to return said identified object or content descriptions to said user.

226. The program of claim 158, further comprising means for determining a first value within said group of sets.

227. The program of claim 226, further comprising:
means for creating a perceptual impression of said first value; and
means for returning said perceptual impression to a user.

228. The program of claim 227, wherein said means for returning said perceptual impression to said user is a graphical user interface.

229. The program of claim 227, wherein said identified object or content descriptions are perceived by a user.

230. The program of claim 226, wherein said first value is a difference between a first measurement and a second measurement within said group of sets.

231. The program of claim 226, wherein said first value is a change over time in a first measurement within said group of sets.

232. The program of claim 226, wherein said first value is a difference between a change over time in a first measurement within said group of sets and a change over time in a second measurement within said group of sets.

233. The program of claim 158, further comprising:
means of determining a first value, wherein said first value is a difference between a value of a first user and a value of a second user.

234. The program of claim 158, further comprising:
means for storing the generated plurality of sets.

235. The program of claim 158, further comprising:
means for storing the associations.

236. The program of claim 158, wherein the means for associating a query with at least one of said plurality of sets comprises associative memory.

* * * * *